UNITED STATES PATENT OFFICE.

SAMUEL MERWIN, OF SPRINGFIELD, MASSACHUSETTS.

IMPROVEMENT IN PREPARED PASTE.

Specification forming part of Letters Patent No. 58,454, dated October 2, 1866.

*To all whom it may concern:*

Be it known that I, SAMUEL MERWIN, of Springfield, Hampden county, Commonwealth of Massachusetts, have invented a new and Improved Prepared Paste; and I do hereby declare that the following is a full and exact description thereof.

My invention consists in the addition of ingredients to the common article of paste used by book-binders and others, and usually formed of wheat-flour and water, which shall have a chemical action on the flour or similar substance, so as to preserve it in condition for use for any length of time desired.

The advantages of this composition can be readily seen, as in this way I reduce to a standard article of commerce what has heretofore been a source of trouble and annoyance, as well as large expense, to every one using it, as paste as usually made soon sours and becomes unfit for use, and therefore requires to be frequently made, and as it is difficult to calculate the exact amount required in most shops, large quantities must be wasted by its souring.

Also, it is a well-known fact that any article of manufacture can be more economically and cheaply manufactured at one or more large establishments, where the materials can be bought in large quantities and at wholesale prices, than the same article can be manufactured by individuals, even if the ingredients are common and easily obtained.

It is the intention to so manufacture this article and sell it in packages of convenient size to consumers, and as it cannot sour or lose its adhesive qualities, it may be kept on hand and used as desired.

This preparation consists of the following ingredients, in substantially this proportion: flour, two pounds; common salt, (chloride of sodium, $NaCl$,) one ounce; alum, one-fourth ounce; corrosive sublimate, (bichloride of mercury, $HgCl_2$,) six grains; acetic acid, one-half ounce.

These are mixed together in the following manner: The salt and corrosive sublimate are precipitated together in warm water and the acetic acid added. The alum is then mixed with the flour, and this latter stirred up in the former mixture and formed into the desired consistency.

As this article can be readily thinned by the addition of water, it may be packed in a very thick state, so as to occupy as little room as possible.

In this state it can be sold, and thinned down for use as desired. In the preparation of this article I have, after experiment, settled on the above formula as most convenient for common manufacturing purposes, but do not wish to confine myself to the exact proportions or ingredients herein described, but claim the use of substantially the same or equivalent articles if they accomplish the same purpose in substantially the same manner.

The objection which would naturally arise from using a rank poison in this composition is met by the well-known fact that the gluten of the flour acts as an antidote to the poisonous qualities of the corrosive sublimate, rendering the compound quite harmless.

Now, having described my invention, what I claim as new, and desire to secure by Letters Patent, is—

As a new article of manufacture, the substance herein described.

SAMUEL MERWIN.

Witnesses:
J. B. GARDINER,
J. E. FULLER.